(12) United States Patent
Catherwood et al.

(10) Patent No.: US 10,983,931 B2
(45) Date of Patent: Apr. 20, 2021

(54) CENTRAL PROCESSING UNIT WITH ENHANCED INSTRUCTION SET

(71) Applicant: Microchip Technology Incorporated, Chandler, AZ (US)

(72) Inventors: Michael Catherwood, Georgetown, TX (US); David Mickey, Chandler, AZ (US); Bryan Kris, Gilbert, AZ (US); Calum Wilkie, Chandler, AZ (US); Jason Sachs, Chandler, AZ (US); Andreas Reiter, Feldkirchen-Westerham (DE)

(73) Assignee: Microchip Technology Incorporated, Chandler, AZ (US)

( * ) Notice: Subject to any disclaimer, the term of this patent is extended or adjusted under 35 U.S.C. 154(b) by 723 days.

(21) Appl. No.: 15/141,823

(22) Filed: Apr. 29, 2016

(65) Prior Publication Data

US 2016/0321202 A1 Nov. 3, 2016

Related U.S. Application Data

(60) Provisional application No. 62/195,692, filed on Jul. 22, 2015, provisional application No. 62/154,927, filed on Apr. 30, 2015.

(51) Int. Cl.
*G06F 13/12* (2006.01)
*G06F 13/16* (2006.01)
(Continued)

(52) U.S. Cl.
CPC ...... *G06F 13/1673* (2013.01); *G06F 9/30043* (2013.01); *G06F 9/3877* (2013.01);
(Continued)

(58) Field of Classification Search
CPC . G06F 11/3672; G06F 11/368; G06F 11/3696
(Continued)

(56) References Cited

U.S. PATENT DOCUMENTS 5,167,028 A * 11/1992 Shires ............... G06F 13/1647
711/147
5,226,138 A * 7/1993 Shermis ............... G06F 9/3804
711/3
(Continued)

FOREIGN PATENT DOCUMENTS

CN 1401168 A 3/2003
CN 1525353 A 9/2004
(Continued)

OTHER PUBLICATIONS

International Search Report and Written Opinion, Application No. PCT/US2016/030159, 14 pages, dated Sep. 26, 2016.
(Continued)

*Primary Examiner* — Titus Wong
(74) *Attorney, Agent, or Firm* — Slayden Grubert Beard PLLC

(57) ABSTRACT

An integrated circuit has a master processing core with a central processing unit coupled with a non-volatile memory and a slave processing core operating independently from the master processing core and having a central processing unit coupled with volatile program memory, wherein the master central processing unit is configured to transfer program instructions into the non-volatile memory of the slave processing core and wherein a transfer of the program instructions is performed by executing a dedicated instruction within the central processing unit of the master processing core.

45 Claims, 10 Drawing Sheets

(51) Int. Cl.
  *G06F 9/30* (2018.01)
  *G06F 9/38* (2018.01)
  *G06F 12/14* (2006.01)
  *G06F 13/40* (2006.01)

(52) U.S. Cl.
  CPC ............ *G06F 9/3879* (2013.01); *G06F 12/14* (2013.01); *G06F 13/4068* (2013.01); *G06F 2212/1052* (2013.01)

(58) Field of Classification Search
  USPC ........................................................ 710/110
  See application file for complete search history.

(56) References Cited

U.S. PATENT DOCUMENTS

| | | | | |
|---|---|---|---|---|
| 6,327,648 | B1* | 12/2001 | Hedayat ................ G06F 9/3879 | 712/35 |
| 6,907,454 | B1* | 6/2005 | Butterworth ............ G06F 15/16 | 709/208 |
| 7,243,116 | B2 | 7/2007 | Suzuki et al. ................. | 707/640 |
| 7,352,828 | B2 | 4/2008 | Terashima et al. ........... | 375/340 |
| 7,571,287 | B2 | 8/2009 | Lee et al. ...................... | 711/149 |
| 9,116,621 | B1* | 8/2015 | Pintiysky ............ G06F 12/1036 | |
| 9,430,409 | B2 | 8/2016 | Berntsen et al. | |
| 2002/0007434 | A1* | 1/2002 | Campardo ............... G06F 9/262 | 711/103 |
| 2002/0056030 | A1 | 5/2002 | Kelly et al. .................... | 711/150 |
| 2002/0059502 | A1 | 5/2002 | Reimer et al. ................. | 711/152 |
| 2002/0091916 | A1* | 7/2002 | Dowling ............. G06F 9/30032 | 712/228 |
| 2003/0005245 | A1* | 1/2003 | Catherwood ......... G06F 9/3802 | 711/163 |
| 2003/0174555 | A1 | 9/2003 | Conle et al. ................... | 365/200 |
| 2005/0188129 | A1* | 8/2005 | Abdelilah ............... G06F 13/28 | 710/52 |
| 2006/0259764 | A1* | 11/2006 | Asal ........................ G06F 21/74 | 713/166 |
| 2007/0150895 | A1 | 6/2007 | Kurland ........................ | 718/102 |
| 2008/0059663 | A1* | 3/2008 | Barry .................... G06F 13/126 | 710/33 |
| 2008/0235493 | A1 | 9/2008 | Fortier ............................ | 712/31 |
| 2010/0070716 | A1* | 3/2010 | Toyoshima ......... G06F 9/30047 | 711/137 |
| 2010/0287443 | A1* | 11/2010 | Rohleder ................ G06F 11/10 | 714/758 |
| 2011/0087922 | A1* | 4/2011 | Lee ..................... G06F 11/2242 | 714/26 |
| 2011/0320797 | A1 | 12/2011 | Wilson et al. .................... | 713/2 |
| 2012/0102333 | A1 | 4/2012 | Wong ........................... | 713/189 |
| 2013/0007320 | A1* | 1/2013 | Langadi ............. G06F 11/1008 | 710/110 |
| 2013/0007345 | A1* | 1/2013 | Barbou-Des-Places ..................... G06F 9/461 | 711/103 |
| 2014/0006692 | A1 | 1/2014 | Berntsen et al. ............. | 711/103 |
| 2016/0092387 | A1 | 3/2016 | Balasubramanian et al. ............... | 710/110 |

FOREIGN PATENT DOCUMENTS

| | | |
|---|---|---|
| CN | 1531275 A | 9/2004 |
| CN | 1724980 A | 1/2006 |
| CN | 104412242 A | 3/2015 |

OTHER PUBLICATIONS

U.S. Non-Final Office Action, U.S. Appl. No. 16/250,274, 25 pages, dated Aug. 21, 2019.
U.S. Final Office Action, U.S. Appl. No. 16/250,274, 20 pages, dated Feb. 20, 2020.
Chinese Office Action, Application No. 201680024293.4, 9 pages, dated Jul. 2, 2020.
European Office Action, Application No. 16722012.8, 4 pages, dated Feb. 12, 2021.

* cited by examiner

| Active BS Security Level | | None | | Standard | | High | |
|---|---|---|---|---|---|---|---|
| Write Protected | | No | Yes | No | Yes | No | Yes |
| Operation | SEG | | | | | | |
| Read | BS | | | ✓ | Secure Vector | | |
| | GS | ✓ | | ✗ | | | |
| | TS | | | | | | |
| Program or Page Erase | BS | ✓ | ✗ | ✓ | ✗ | ✓ | ✗ |
| | GS | ✓ | | ✗ | | | |
| | TS | | | | | | |

Figure 8

| Active BS Security Level | | None | | Standard | | High | |
|---|---|---|---|---|---|---|---|
| Write Protected | | No | Yes | No | Yes | No | Yes |
| Operation | SEG | | | | | | |
| Read or PRAM access (using LDSLV/VFSLV) | BS | | | ✓ | Secure Vector | | |
| | GS | ✓ | | ✗ | | | |
| | TS | | | | | | |
| Program or Page Erase | BS | ✓ | ✗ | ✓ | ✗ | ✓ | ✗ |
| | GS | ✓ | | ✗ | | | |
| | TS | | | | | | |

Figure 9

| Active GS Security Level: | | None | | Standard | | High | |
|---|---|---|---|---|---|---|---|
| Write Protected: | | No | Yes | No | Yes | No | Yes |
| Operation | SEG | | | | | | |
| Read | BS | | ✓ | | | ✗ | |
| | DS | | | ✓ | | | |
| | TS | ✓ | | ✗ | | | |
| Program or Page Erase | BS | ✓ (1) | ✗ | ✓ (1) | | ✗ | |
| | DS | ✓ (1) | ✗ | ✓ (1) | ✗ | ✓ (1) | ✗ |
| | TS | ✓ (1) | | ✗ | | | |

CENTRAL PROCESSING UNIT WITH ENHANCED INSTRUCTION SET

RELATED PATENT APPLICATION

This application claims priority to commonly owned U.S. Provisional Patent Application No. 62/154,927, filed Apr. 30, 2015 and U.S. Provisional Patent Application No. 62/195,692 filed Jul. 22, 2015, which are hereby incorporated by reference herein for all purposes.

TECHNICAL FIELD

The present disclosure relates to central processing units (CPU), in particular microcontrollers with a digital signal processing units (DSP). The present disclosure furthermore relates to multi-processor integrated circuit devices, in particular to microcontrollers with multiple processors.

BACKGROUND

Embedded systems generally comprise a central processing unit (CPU), memory and a plurality of peripheral devices to form a single chip system or a single chip microcontroller. More advanced systems comprise more than one CPU. A CPU may furthermore be enhanced to have digital signal processing capabilities such as the dsPIC cores manufactured by the Assignee of this application. FIG. 1 shows a block diagram of such a processing core. As can be seen, this core has typical digital signal processing capabilities such as an X Data RAM and a separate Y Data RAM and a DSP engine coupled with the RAMS and a register file such that the RAMs can be accessed both in parallel. Other typical elements of this processing core are shown. In addition this conventional DSP microcontroller shows in FIG. 1 at the bottom certain peripheral devices coupled through the system bus with the core. FIG. 2 shows registers of the core, such as the working registers of the register file and accumulator of the DSP engine as well as other typical DSP registers. FIG. 3 shows a more detailed block diagram of the DSP engine of the block diagram of FIG. 1. The processing core as shown in FIGS. 1-3 is a single processing core that comprises digital signal processing capabilities. It can be used in multi-core device as one of the cores.

SUMMARY

There exists a need for an improved instruction set for such a processing core in particular when used in a multi-core device such as, for example, a dual core microcontroller comprising signal processing capabilities in at least one of its cores.

Multi-processor core microcontrollers may be designed with entirely separated cores and each core may operate on a different system clock. Thus, to provide for the ability to communicate between the two or more cores, a specific communication interface is necessary. In particular, a means to move code protected data between processor memories on a multi-processor device is needed. Solution had to be fully configurable yet be efficient with regards to silicon use.

In a master-slave configuration of a multi-processor microcontroller, support for a dual-core slave processor program load/verify methodology is needed while code protection is maintained after program is loaded into the slave.

According to an embodiment, an integrated circuit may comprise: a master processing core having a central processing unit coupled with a non-volatile memory; and a slave processing core operating independently from the master processing core and having a central processing unit coupled with volatile program memory; wherein the master central processing unit is configured to transfer program instructions into the non-volatile memory of the slave processing core; and wherein a transfer of said program instructions is performed by executing a dedicated instruction within the central processing unit of the master processing core.

According to a further embodiment, the dedicated instruction has a first operand defining a source address and a second operand defining a destination address, wherein the destination address is auto-incremented after execution of the instruction. According to a further embodiment, the dedicated instruction causes an information word to be transferred into a buffer, and wherein the information is written into the volatile program memory from the buffer. According to a further embodiment, the instruction causes the non-volatile memory to output said information whereupon said information is captured by said buffer. According to a further embodiment, the information is a 24 bit word. According to a further embodiment, the integrated circuit comprises a plurality of slave processing cores and the dedicated instruction has a third operand defining a target slave processing unit. According to a further embodiment, the source address stored in the first operand can optionally be auto-incremented after execution of the instruction. According to a further embodiment, the source address is a special function register of a peripheral device associated with the master processing core. According to a further embodiment, the peripheral device is a serial communication peripheral. According to a further embodiment, the peripheral device is a parallel input port. According to a further embodiment, the master processing core is further operable to execute a further instruction that verifies an information stored in the non-volatile program memory. According to a further embodiment, the further instruction causes a first information to be transferred into the buffer and wherein the content of the buffer is compared with a second information stored in the volatile memory. According to a further embodiment, the further instruction comprises a first address which is applied to the non-volatile memory to output the first information and a second address which is applied to the volatile memory to output the second information. According to a further embodiment, the further instruction further verifies error correcting code (ECC) associated with the first and second information. According to a further embodiment, the ECC associated with the non-volatile memory can be read from the non-volatile memory and the ECC associated with the source is separately generated. According to a further embodiment, the non-volatile memory of the first processing core comprises a code protection defined by a protection scheme and wherein the volatile program memory of the slave processing unit has a code protection that depends on a setting of the protection scheme. According to a further embodiment, the protection scheme defines a plurality of segments of the non-volatile memory and wherein each segment has a protection setting in the protection scheme. According to a further embodiment, each protection setting for the non-volatile memory has a setting for a read operation and a setting for a program or erase operation. According to a further embodiment, the protection scheme provides for a predefined number of security levels, wherein each security level defines a protection setting for each segment. According to a further embodiment, the code protection for the volatile program memory is the same as the code protection for one of the segments of the non-volatile memory. According to a further embodiment, a register stores which segment of the non-volatile memory is selected to provide the code protection setting for the volatile memory. According to a further embodiment, a setting for a read operation of the non-volatile memory applies to read and write operations of the volatile memory. According to a further embodiment, when a segment is protected, depending on a protection setting an instruction executed from one segment may not operate on a different segment. According to a further embodiment, when a segment is protected, depending on a protection setting an read instruction executed from one segment may operate only on a predefined area of a different segment. According to a further embodiment, the predefined area stores interrupt vectors. According to a further embodiment, the non-volatile memory comprises a boot segment and a general segment. According to a further embodiment, the non-volatile memory further comprises a test segment.

According to another embodiment, a method for providing firmware for a processing core in a multi-core integrated circuit processing device comprising a first processing core having a first central processing unit coupled with a non-volatile memory and a second processing core operating independently from the first processing core and having a second central processing unit coupled with volatile program memory, may comprise: executing a dedicated instruction within the first central processing unit which causes data to be written into the non-volatile memory of the slave processing core.

According to a further embodiment of the method, the dedicated instruction has a first operand defining a source address and a second operand defining a destination address, wherein the destination address is auto-incremented after execution of the instruction. According to a further embodiment of the method, upon execution of the dedicated instruction, an information word is transferred from the non-volatile memory into a buffer, and the information is written into the volatile program memory from the buffer. According to a further embodiment of the method, the method may further comprise repeating said dedicated instruction in a loop. According to a further embodiment of the method, the integrated circuit comprises a plurality of slave processing cores and the dedicated instruction has a third operand defining a target slave processing unit. According to a further embodiment of the method, the source address stored in the first operand can optionally be auto-incremented after execution of the instruction. According to a further embodiment of the method, the method may further comprise executing by the master processing core a further instruction that verifies an information stored in the non-volatile program memory. According to a further embodiment of the method, the further instruction causes a first information to be transferred into the buffer and wherein the content of the buffer is compared with a second information stored in the volatile memory. According to a further embodiment of the method, the further instruction comprises a first address which is applied to the non-volatile memory to output the first information and a second address which is applied to the volatile memory to output the second information. According to a further embodiment of the method, the further instruction further verifies error correcting code (ECC) associated with the first and second information. According to a further embodiment of the method, the ECC associated with the non-volatile memory can be read from the non-volatile memory and the ECC associated with the source is separately generated. According to a further embodiment of the method, the non-volatile memory of the first processing core comprises a code protection defined by a protection scheme and wherein the volatile program memory of the slave processing unit has a code protection that depends on a setting of the protection scheme. According to a further embodiment of the method, the protection scheme defines a plurality of segments of the non-volatile memory and wherein each segment has a protection setting in the protection scheme. According to a further embodiment of the method, each protection setting for the non-volatile memory has a setting for a read operation and a setting for a program or erase operation. According to a further embodiment of the method, the protection scheme provides for a predefined number of security levels, wherein each security level defines a protection setting for each segment. According to a further embodiment of the method, the code protection for the volatile program memory is the same as the code protection for one of the segments of the non-volatile memory. According to a further embodiment of the method, a register stores which segment of the non-volatile memory is selected to provide the code protection setting for the volatile memory. According to a further embodiment of the method, a setting for a read operation of the non-volatile memory applies to read and write operations of the volatile memory. According to a further embodiment of the method, when a segment is protected, depending on a protection setting an instruction executed from one segment may not operate on a different segment. According to a further embodiment of the method, when a segment is protected, depending on a protection setting an read instruction executed from one segment may operate only on a predefined area of a different segment. According to a further embodiment of the method, the predefined area stores interrupt vectors. According to a further embodiment of the method, the non-volatile memory comprises a boot segment and a general segment. According to a further embodiment of the method, the non-volatile memory further comprises a test segment.

BRIEF DESCRIPTION OF THE DRAWINGS

FIGS. 8-11 show tables with various security levels.

DETAILED DESCRIPTION

Figure 1:
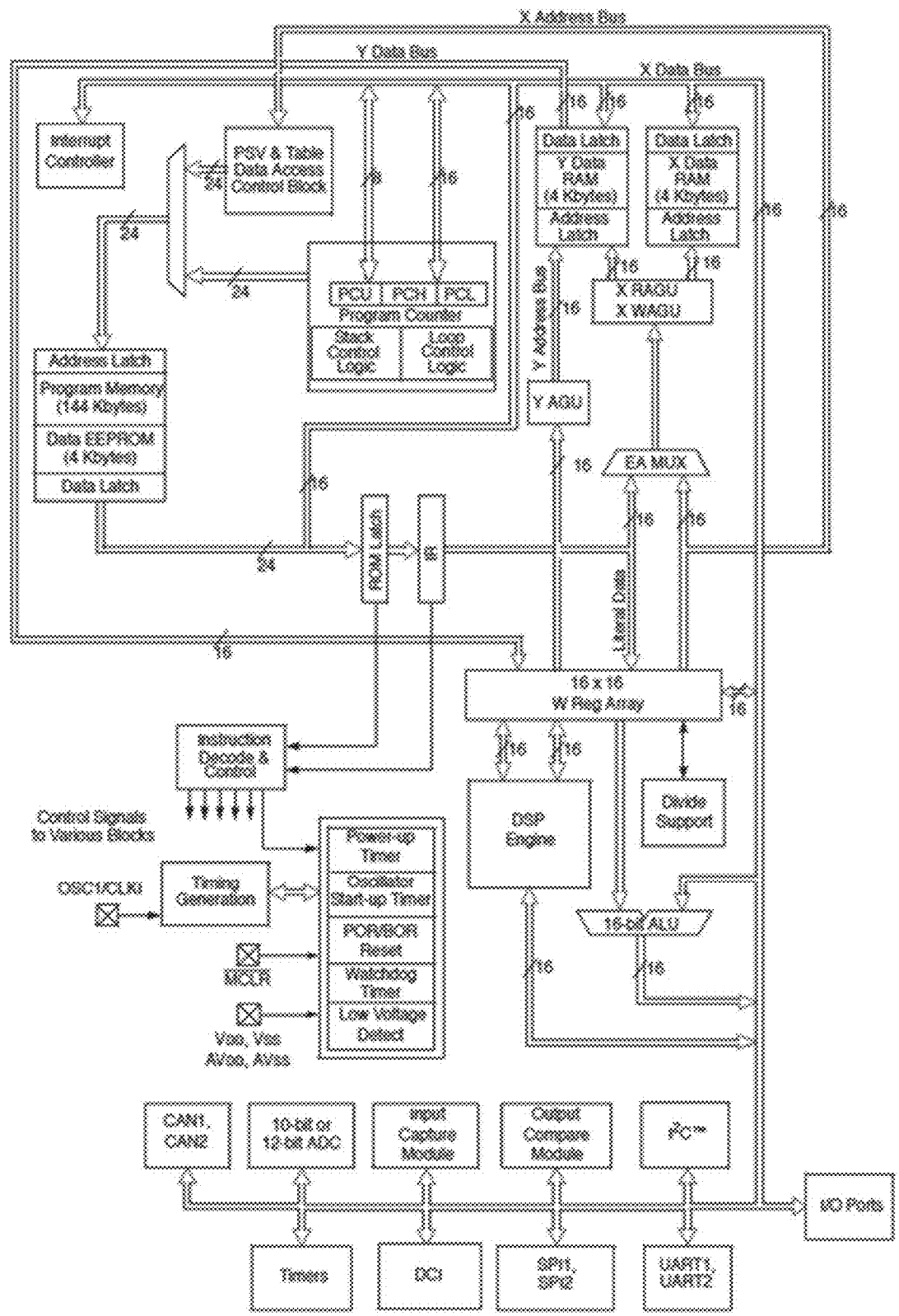
FIG. 1 shows a block diagram of a microcontroller with a single CPU having digital signal capabilities.
Figure 2:
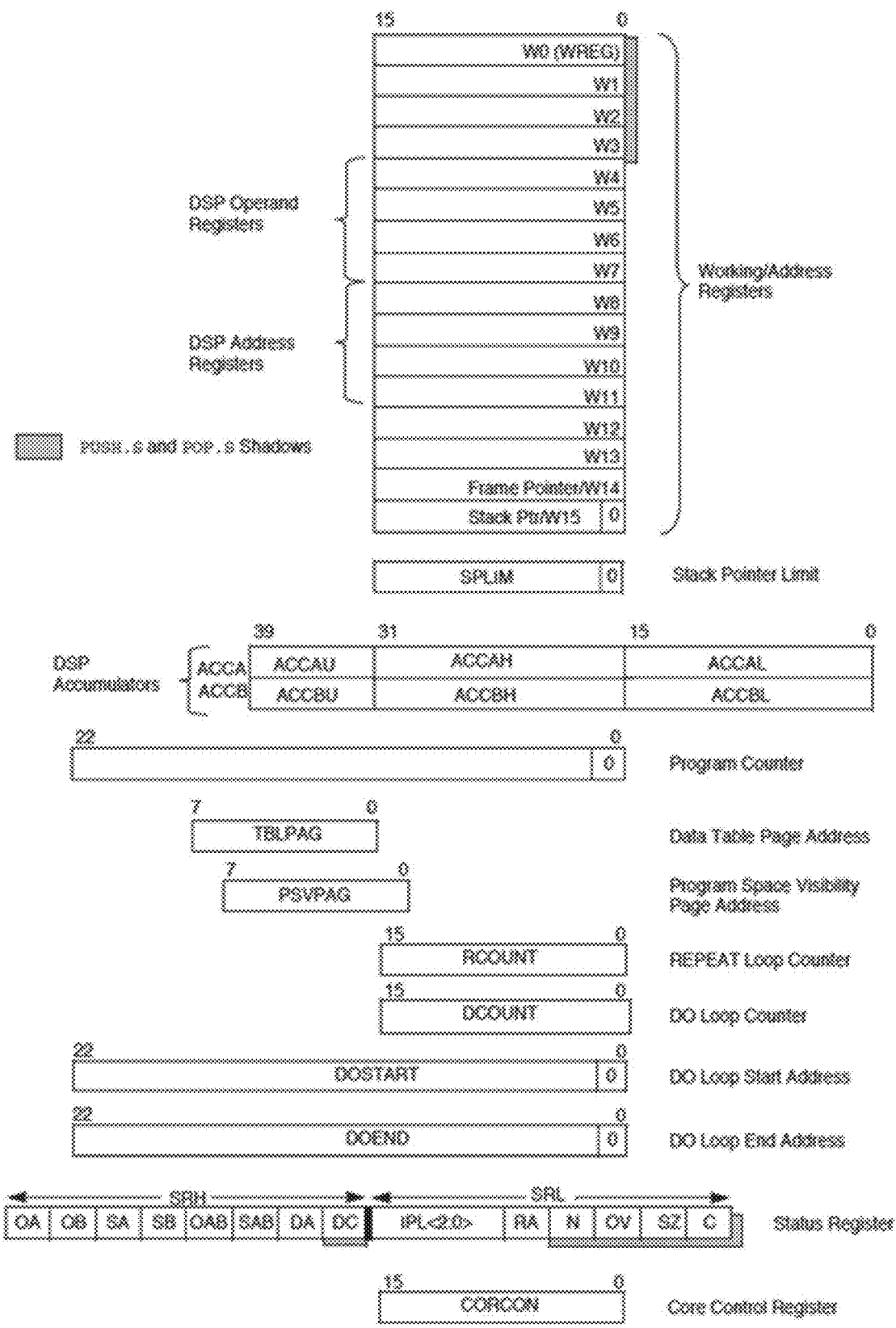
FIG. 2 shows various registers of the CPU according to FIG. 1.
Figure 3:
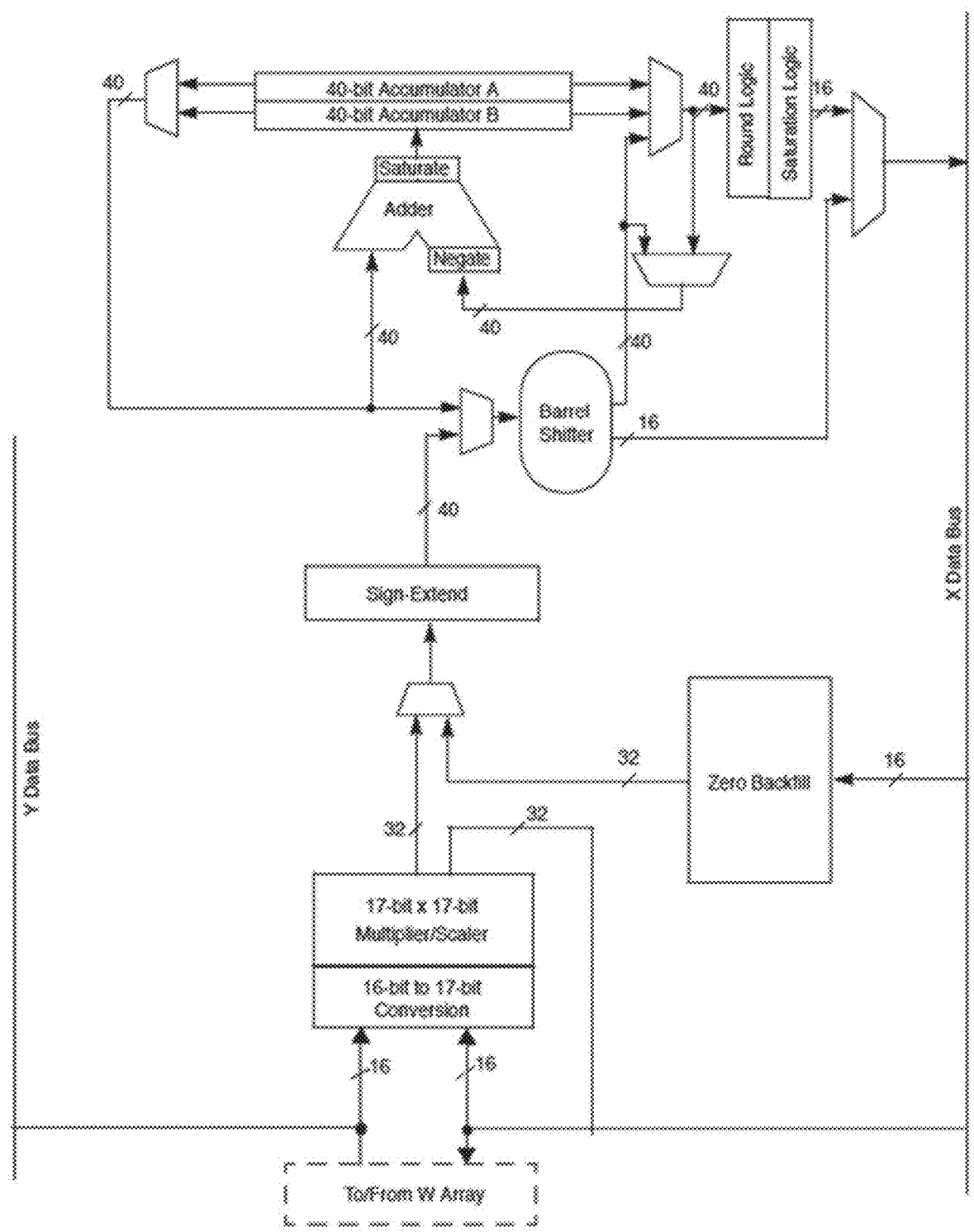
FIG. 3 shows specific parts of a DSP engine of a CPU according to FIG. 1.
Figure 4:
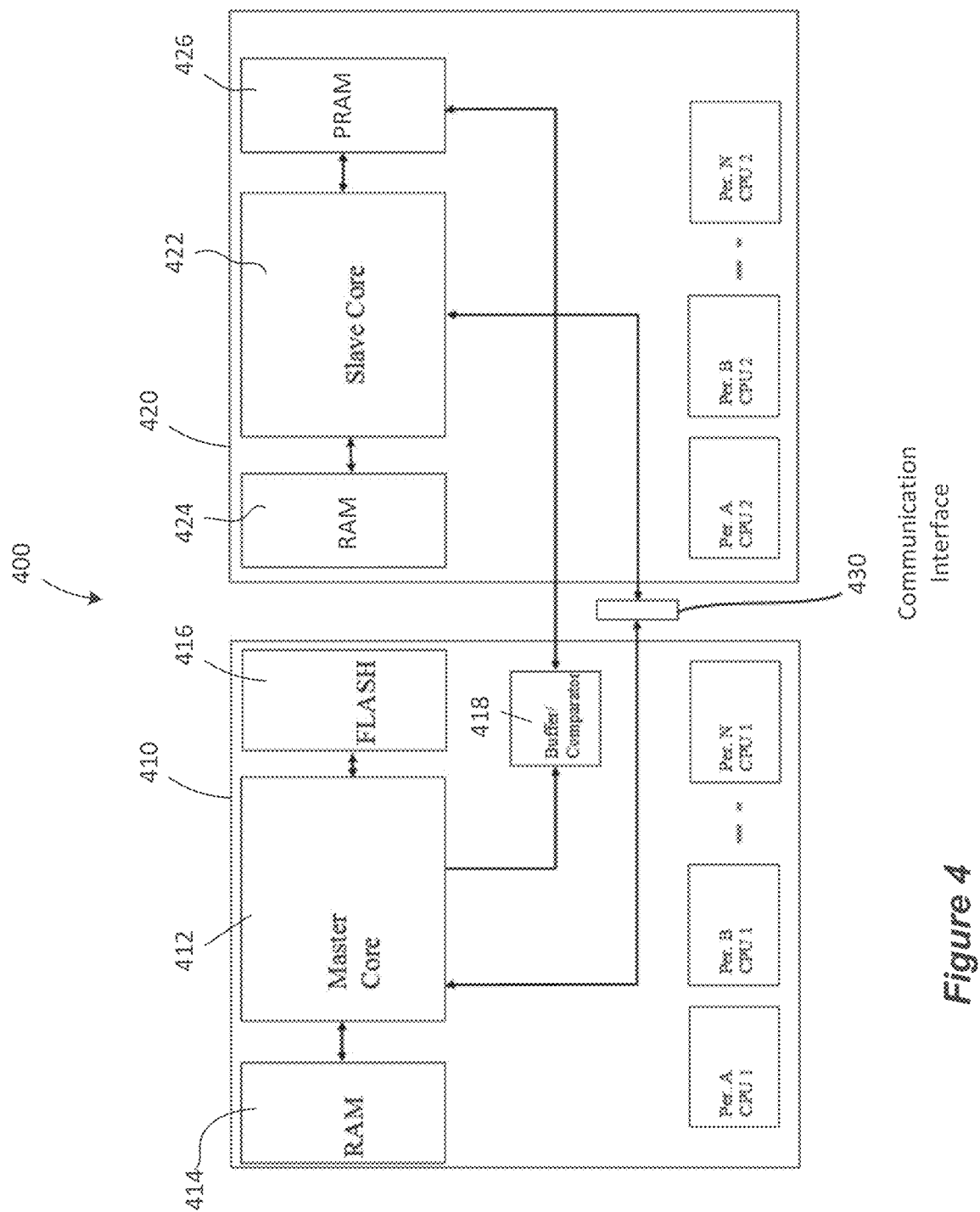
FIG. 4 shows a dual-core microcontroller according to an embodiment.
Figure 5:
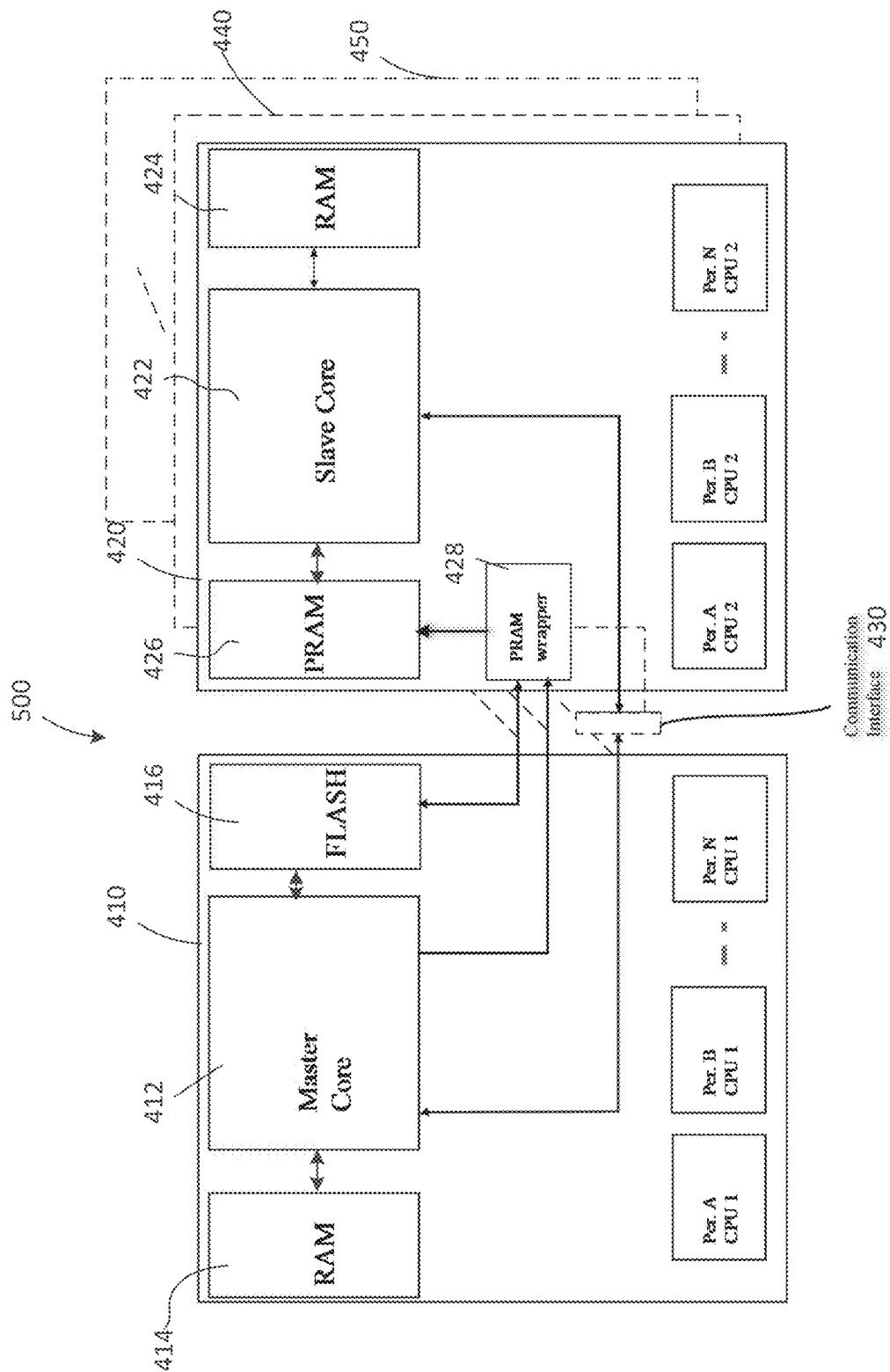
FIG. 5 shows a dual or multi-core microcontroller according to various embodiments.

As shown in FIGS. 4 and 5, a dual or multi core processing device 400 can be designed to have a master microcontroller 410 with a master central processing unit (CPU) 412 and one or slave units 420 each having a slave central processing unit 422 wherein a core design of each slave central processing unit 422 may be generally identical or similar to the core design of the master CPU 412. However, according to other embodiments, the slave CPU 422 may be different from the master CPU 412. The master microcontroller has its own set of peripheral devices as shown in FIG. 4. A slave unit 420 may or may not have its own set of peripheral devices and, thus, form a microcontroller by itself. Thus, each master and slave device form more or less completely independent processing devices and may communicate with a dedicated bus or communication interface 430. FIGS. 4 and 5 shows such a design with a master microcontroller 410 and a single slave microcontroller 420. A communication interface 430 is provided that allows for communication between the two cores 410, 420. Each processor 412, 422 may be designed in a Harvard architecture as shown. However, the principles according to the various embodiments may be easily translated into a von Neumann architecture. The master unit comprises, e.g., flash memory 416 used as the program memory and random access memory 414 used as data memory, each coupled with the master core 412.

As shown in FIGS. 4 and 5, the slave unit 420 can be designed without flash memory. Instead a dedicated program random access memory 426 is provided. Due to the fact that this memory is volatile it will be loaded through the master 410 according to various embodiments. This design choice has the advantage that a bottleneck provided by flash technology is avoided. Flash memory is generally slower than RAM. Hence, there will be no read delays and the slave can be operated at a higher execution speed which may be very beneficial for certain high speed applications such as, e.g., SMPS applications. As stated above, more than one slave unit 420 may be implemented according to various embodiments. In case both cores are identical, the master core 412 can be designed to include additional instructions which may either not be implemented in the slave unit 422 or non functional in the slave unit. These additional instructions allow the transfer of data from the flash memory 416 or from an external source into the PRAM 426 of the slave device 420. For example, according to an embodiment, multiple cores may be implemented within a single chip device and each core may have an assigned configuration register, wherein one of the bits of such a register may define whether the respective unit is a master or a slave. Logic may be present that allows for only one of the cores to be set as a master. Once this bit has been set, the additional instruction may be allowed to be executed. In the other units (slaves) these instructions may not be executed, for example, they could be interpreted as illegal opcodes.

Control logic to access the PRAM 426 by the master unit 410 can be either located in the master unit as shown in FIG. 4 with buffer/comparator unit 418. Alternatively, a similar unit may be arranged within the slave unit 420 as shown in FIG. 5 with PRAM wrapper unit 428. Either unit is designed to grant access of the PRAM either exclusively to the master unit 410 or to the slave unit 420. Other embodiments may place some part of the logic within the master core and other parts in the salve core or arrange the logic outside both units. Similarly, communication interface 430 may be insider either unit or entirely outside both units. Additional control for the PRAM access units 418 or 428 may be provided by the communication interface 430 as indicated in FIG. 5 with the dotted line. FIG. 5 also shows additional slave units 440 and 450 with dotted lines. All units may connect through a bus and associated wrapper units 428 in each slave unit. The embodiments are therefore not limited to a dual core implementation. A person skilled in the art will realize that other implementations are possible.

Figure 6:
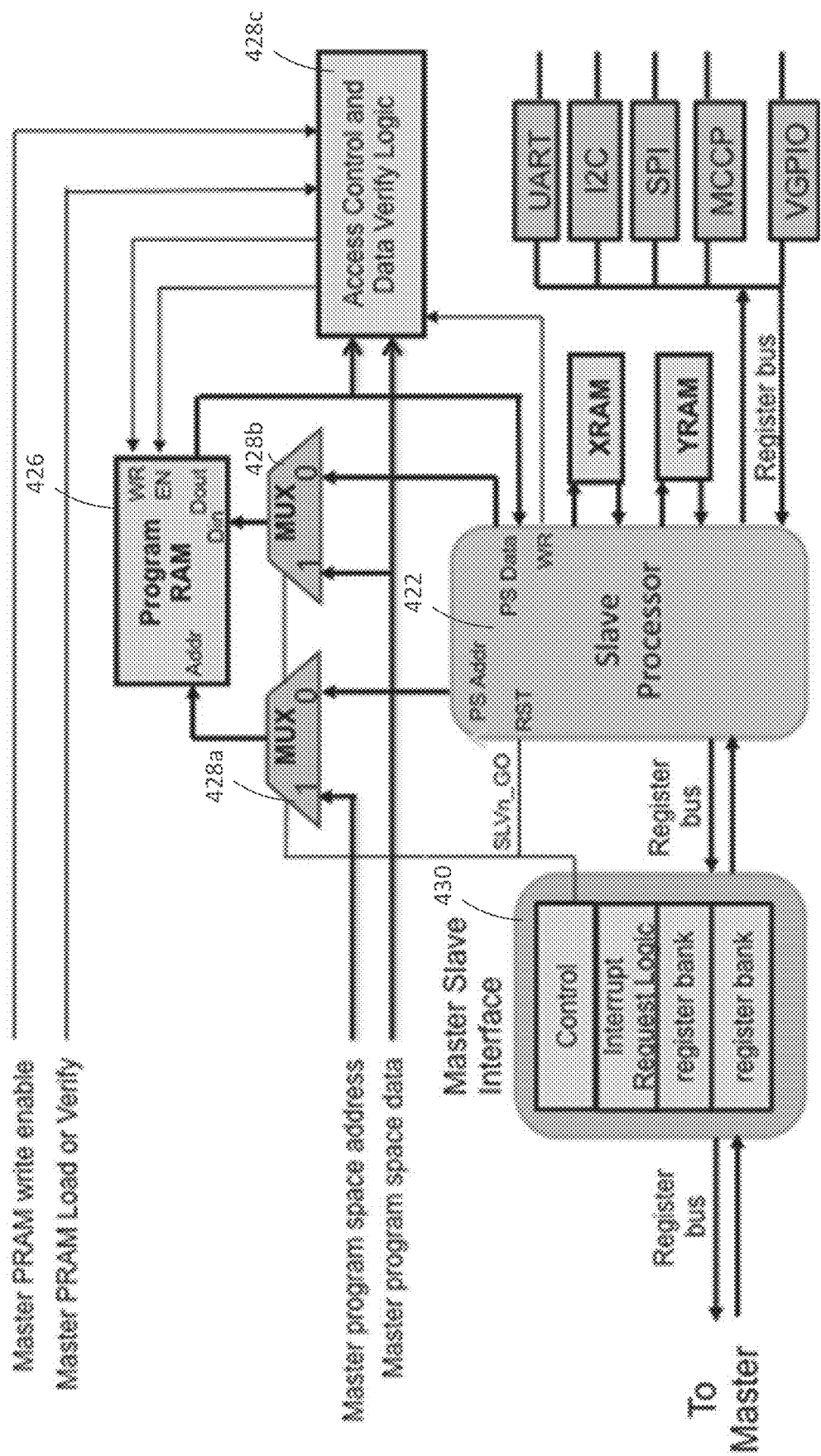
FIG. 6 shows details of how the program RAM can be accessed according to some embodiments.

FIG. 6 shows a block diagram of an exemplary interface at the slave side. In this exemplary embodiment, the master slave interface forms the communication interface 430. Two multiplexers 428a, 428b grant access to the data and address bus of the program RAM 426, respectively. Additional access logic 428c is shown which is connected to the master unit 410, the slave core 422 and the PRAM 426. In this embodiment, the communication interface 430 controls the multiplexers to give access to the master unit 410 while the slave processor is held in a reset state. Once the PRAM 426 has been loaded with the slave firmware, the multiplexers 428a, 428b will be controlled to grant access back to the slave unit 420 and the CPU 422 will be released from reset. The access control and data verify logic 428c may distribute the read and write and enable signals which may come either from the master unit 410 or the slave unit 420. The interface as shown in FIG. 6 may provide a write only path between the master unit 410 and the PRAM 426. In such an implementation, the access control and data verify logic 428c may be configured to perform a verification of written data. For example, according to one embodiment, the access control and data verify logic may operate in two different modes when coupled with the master unit 410. In a first mode, it provides the logic signals for writing the slave firmware into the PRAM 426, wherein data bytes are written in any suitable manner, for example, consecutively into the PRAM 426. In a second mode, the unit 428c may provide a verification function. Instead of writing the data transmitted, the unit 428c compares the data provided by the master unit 410 with the content of PRAM 426 to verify that it has been programmed correctly. Other embodiments of the master/slave interface with respect to the PRAM are possible.

Thus, according to various embodiments, a Slave processor load/verify methodology for a multi-core device, in particular a dual core microcontroller, can be provided. This provides an improved efficiency and performance with respect to conventional multi-core devices, especially for tight control loop applications (e.g. SMPS applications) using a DSP engine within the core. However, a processing core does not have to be designed to include a DSP engine. The principles according to various embodiments apply to a processing core which only includes a conventional CPU. Furthermore, the efficiency and performance of an associated C compiler will be improved by such an improved instruction set.

According to various embodiments, a new dual-(multi-) core architecture includes dedicated CPU instructions to load & verify the Slave core Program RAM (PRAM). As performance requirements increase, in particular, for DSP based applications, the need to improve CPU throughput, in particular the DSP engine throughput, became evident: For example, there exists a need for increased speed. According to one embodiment, a dual core device targets 100MHz for the Master unit 410 using Flash memory as its program memory (e.g., at 0.75 MIPs/MHz) and 120MHz for the Slave unit 420 using PRAM as its program memory (e.g., at 0.9 MIPs/MHz). As mentioned above, the PRAM choice for program memory 426 in the slave unit 420 allows this unit to run more efficiently and at a higher speed. Furthermore, according to some embodiments, latency with hardware context switching for DSP may also need to be reduced. Finally, according to other embodiments, ISA improvements may be needed to improve DSP algorithm efficiency. Gains in compiler efficiency could be achieved with bit field instructions and a faster divider with a more flexible register utilization according to some embodiments.

Some of these improvements could be achieved by adding new instructions and capabilities with minimal changes to the existing design. Other improvements may be achieved by accelerating divide operations using the same iterative non-restoring algorithm. The following improvements can be implemented independently. Thus, various embodiments may use all or a subset of these improvements.

In summary, CPU improvements may comprise: Dual-core support instructions which provide for some or all of the following DSP improvements: Load & verify the Slave core Program RAM (PRAM); Hardware context switch extended to include DSP accumulators, status and DSP engine configuration; Data limit (bounds checking) instructions; Accumulator 32-bit data load/store instructions; and DSP normalization instruction. Compiler efficiency gains that can be achieved are: Bit field instructions and Divide instruction improvements.

According to various embodiments, a dual core microcontroller with DSP functionality may comprise a Slave core with PRAM Load (LDSLV) & Verify (VFSLV) instructions added to facilitate Slave program initialization. These instructions are designed to be a faster alternative to moving data from a memory mapped image of the PRAM when compared to using conventional program space visibility (PSV) addressing or TBLWTx instructions. The instructions are only enabled when the CPU is instantiated as a Master (CPU_IS_MASTER=1) as mentioned above. When disabled, they will be considered to be illegal opcodes.

Another benefit of using unique instructions to load/verify the PRAM is that it simplifies the design and verification by not having to remap the PRAM into Master address space, and keeping the existing PSV CPU instruction flow (and just have the Slave snoop the passing address & data). According to one embodiment an existing MOV instruction could be enhanced with a control flag to enable a Slave PRAM capture function. However, it is more beneficial to create unique instructions (similar to the MOV opcode but ones that also asserted a signal to the Slave to tell it to switch the PRAM into the Master clock domain and load it) as it allows to add a level of better clarity to a user in regards to how the PRAM was initialized (and a little security in so much as it is unlikely that these ops would ever be inadvertently executed).

The LDSLV instruction according to some embodiments differs from other data move instructions in so much as it can move an entire instruction word (I-word) from PS (Flash) to PS (Save PRAM) in 2 cycles. Each read will fetch a 24-bit word from Flash and then effect a write of that word into the target Slave PRAM. A conventional dsPIC/PIC24 CPU architecture has no means to move data values larger than 16-bits from Flash, so the data is not moved through the Master CPU but captured (when available on the Flash data bus) by the Slave. Thus, these new instructions are unique in that they are capable of moving data (as a single entity) that is wider than the natural data width of the processor that is executing them.

The Slave will use the captured data to either write it to the specified PRAM address (LDSLV), or compare it with the contents of the specified PRAM address (VFSLV). The LDSLV/VFSLV instructions operate in an identical fashion except that VFSLV asserts signal cpu_slave_pram_verify_en to indicate that data read from the Master Flash is to be compared against the PRAM contents (instead of being loaded into the PRAM).

These instructions may allow to transfer data from a predefined source including the flash memory 416 of the master device 410 into the program RAM (PRAM) 426. To this end, the master device 410 may provide for dedicated instructions to transfer and to verify transferred data. For example:

a load slave instruction LDSLV which moves a data word from Master Flash image 416 into a Slave PRAM wrapper or buffer 418/428 where it is captured along with a target address. Such an instruction would define an indirect source address, for example, with or without post increment functionality, an indirect destination address with post increment functionality and a literal that would define which one of a plurality of slaves is the destination. However, in a dual core (single slave) implementation the literal could also be omitted. The option of having post increment functionality on the source allows the LDSLV/VFSLV to automatically increment to the next source address after execution, in preparation for the subsequent LDSLV/VFSLV iteration. This is especially useful when executing from within a REPEAT loop. When not using the post-increment option, the same instruction could be used to write a block of identical data in the destination PRAM 426 (also known as blockfill). Alternatively, the source address could point to a n-bit, e.g., 24-bit, special function register of a master peripheral device, for example the Flash Controller programming data register. According to other embodiments, the source could potentially also be a parallel input port, a serial receive buffer, etc. Some embodiments may only be able to use an n-bit register, e.g., a 24-bit register, that is mapped into program address space. Thus, by directing external data to the 24-bit special function register, it could be indirectly written into the PRAM 426 of the slave device 420. The post increment function may however, be the main function to transfer program data out of the master flash memory 416 into the slave PRAM 426. In one embodiment, master flash 416 and slave PRAM 426 may be organized identical and each data word read could be directly transferred into the PRAM 426 by an appropriate logic 428. However, in some embodiments, the PRAM 426 may be organized in a different fashion than the Flash memory 416. For example, flash memory 416 could be organized in 24 bit words, whereas PRAM 426 could be organized in 48 bit words. In such an implementation, a buffer 418/428 may be provided that stores a first read from Flash memory 416 and writes the stored data together with a subsequent read into the PRAM 426. According to some embodiments, the limitation here may not be the width of the source Flash data, but the fact that the LDSLV/VFSLV operation can only work on a single n-bit value, e.g., a 24-bit value. So even if the source Flash were 48-bits wide, only a 24-bit value can ever be moved in such an embodiment. Other embodiments may not be restricted to such a value. Other transfer mechanism may apply according to the specific design choices for the various memories. Moreover, error correction coding (ECC) may be implemented in Flash memory 416 and in the PRAM 426. With respect to error correction, even if the Flash and PRAM are both the same word width with ECC, according to an embodiment, the ECC parity data is not copied. Rather, it's always regenerated within the PRAM wrapper when loading it. According to some embodiments, this may be due to the limitation of reusing the existing PSV model which can only utilize the existing 24-bit data paths in the core. Again, other embodiments may not face such a restriction.

a verify slave instruction VFSLV which reads, e.g., a 24-bit data word from Master Flash image and compares data to the contents of the PRAM 426. Thus, a comparator may be provided to perform the actual comparison of the data stored in Flash memory and in the PRAM. While the Flash memory may be designed with respect to the ECC functionality that this additional information is not readable according to some embodiments, the ECC data from RAM may be readable. The comparison mechanism, for example a buffer and associated comparator, may be equipped with logic to generate ECC data from the read Flash memory data. Thus, this instruction may recalculate ECC parity on Master data and compares with stored PRAM ECC for complete verify, and may also flag a ('sticky') verify error (in MSI macro) in the event of a bad compare according to some embodiments.

the LDSLV/VFSLV instructions may be designed to be executed within a REPEAT loop; they may use existing data pipeline to accelerate transfers to 1 word/cycle from (up to) 3 cycle (access time) Flash in some embodiments. A first execution may require more than 1 cycle, for example 5 cycles in order to prime the data pipeline and handle data alignment. However, any subsequent transfer could be done in a single cycle. A last instruction or wrap up may require for example 3 cycles to unroll the data pipeline. Depending on the size of the program to be transferred into the PRAM, the single cycle transfers within the repeat loop speeds up transfer significantly. Other embodiments may generally execute each instruction in a single cycle.

When operating in Slave Dual Panel mode according to some embodiments: the LDSLV/VFSLV instructions may only have access to Active PRAM when the Slave is disabled; and the LDSLV/VFSLV instructions may always have access to Inactive PRAM. Dual Panel mode applies to some devices that split the PRAM into two separate blocks. In this mode, the PRAM control is such that the Slave may continue to execute from the "Active" panel while the "Inactive" panel is being (re)loaded by the Master (presumably with a new PRAM image that has been reprogrammed into Flash during a device update). Once complete, the Master signals the Slave that it may switch panels (on-the-fly using a dedicated instructions, e.g. the BOOTSWP instruction). This is a very specialized "Live Update" scheme that may be implemented in some embodiments and is designed to allow the Slave to keep executing (e.g., an SMPS inner control loop) while a software update is being re-Flashed into the device. Applications who run these loops at 100's KHz or more, do not want the down-time associated with a full device reset (milliseconds), so want to be able to load the new PRAM code then instantly swap to it without a reset. Firmware for such embodiments may require a smart hand-over because all BOOTSWP does is literally just switch PRAM panels. When the device resets as normal (at some future time), the new PRAM code would be loaded into the "Active" panel as normal.

Code Examples:

Example 1

LDSLV: PRAM Load from Flash

```
; Slave #0 PRAM:
; load sequence prior to Slave being
; enabled
    movpag      #PRAM_DATA_PAGE,DSRPAG
    mov .w      #PRAM_DATA_BASE,w2
    clr.w       w5
    repeat      #PRAM LENGTH-1
    ldslv       [w2++], [w5++],#0
```

The code snippet shown in Example 1 demonstrates how the LDSLV instruction could be used during application initialization to load the PRAM of Slave #0.

Example 2

VFSLV: PRAM Verify from Flash

```
; Slave #0 PRAM:
; validation sequence prior to
; Slave being enabled.
    movpag      #PRAM_DATA_PAGE,DSRPAG
    mov .w      #PRAM_DATA_BASE,w2
    clr.w       w5
    repeat      #PRAM LENGTH-1
    vfslv       [w2++], [w5++],#0
; VERFERR=1 if mismatch detected
    Btss.b      MSI0STAT, VERFERR
    bra  PRAMOK      ; exit with no error
    equ *            ; exit with error
```

The code snippet shown in Example 2 demonstrates how the VFSLV instruction could be used during application initialization to verify the PRAM contents of Slave #0.

Example 3

LDSLV: PRAM Block Fill from Flash

```
; Slave #0 PRAM:
; block fill prior to Slave being
; enabled.
    movpag      #FILL_OPCODE_PAGE,DSRPAG
    mov.w       #FILL_OPCODE_ADDR,w2
    clr.w       w5
    repeat      #PRAM LENGTH-1
    ldslv       [w2], [w5++],#0
```

The code snippet shown in Example 3 demonstrates how the LDSLV instruction could be used to block fill (i.e., load with a constant value) the PRAM of Slave #0. In this case, the constant is sourced from Flash using register indirect address for LDSLV (no post-increment).

Example 4

LDSLV: PRAM Load from NVMDATAL

```
; Slave #0 PRAM:
; load PRAM addressed by pointer in
; w5 with opcode held in NVMDATAL
; while Slave is disabled.
; Verify data move.
; Exit with PRAM pointer incremented.
; Load DSRPAG and w2 to address
; NVMDATAL register
    movpag      #NVMDATAL
    mov.w       #NVMDATAL,w2
    ldslv       [w2], [w5++],#0
    dec2        w5, w5
    vfslv       [w2], [w5++],#0
; VERFERR=1 if mismatch detected
    btss.b      MSI0STAT, VERFERR
    bra         PRAMOK; exit with no error
    equ         *    ; exit with error
```

Alternatively, the block fill opcode value may be a variable sourced from the NVM Controller 24-bit NVMDATAL register. The NVMDATAL register is located within PS and becomes a 24-bit r/w register when the NVM Controller is not enabled for Flash program/erase (i.e., NVMCON.WREN=0). The register is write-only whenever Flash program/erase is enabled (i.e., NVMCON.WREN=1). Any instruction opcode may be loaded into NVMDATAL and subsequently loaded into the PRAM. The VFSLV instruction may be used in the same manner to confirm the success of the LDSLV operation. This approach may also be used to load all or part of the PRAM with data sourced externally from the device, removing the need to first program it into the Master Flash memory as shown in Example 4.

According to some embodiments, additional instructions may be implemented in a CPU with DSP engine. Such additional instructions do not necessarily require the implementation of the above mentioned load/verify instructions. Moreover, they do not require a multi core design but could also be implemented in a single core device comprising a CPU and integrated DSP engine.

Thus, according to some embodiments, a first type of instruction may be a 16-bit data bounds check and limit functionality may add Force data Limit (FLIM/FLIM.v) instructions to accelerate 16-bit data bounds check and limit operations. Such an instruction compares a target signed value with an upper and lower limit held in respective W registers. If the target value is greater than upper or less than lower limit, the exceeded limit register is loaded with the target signed value. Thus, a saturation function can be defined with user selectable upper and lower limits. Such an instruction can be implemented in two versions:

FLIM: Performs the above mentioned function on any of the working registers of a CPU and sets status bits to indicate result FLIM.v: Sets status bits to indicate result; Saves signed value by which limit is exceeded into Wn which can be useful for anti-windup algorithms. Thus, this instruction performs the same function as FLIM but also stores the overshoot (or undershoot) value in a designated register as shown in the code snippet of example 5 below.

Example 5

```
*
* Constrain 16-bit Result to limits
* defined in W3:W4 (max:min).
* Write limit excess into W12.
* Exit to Error if limits exceed else
* continue.
*
    MOV.L     #Result,W7
    FLIM.v    W3, [W7],W12
    BRA       NZ,Error
```

A second additional instruction is an accumulator max and min instructions (MAXAB/MINAB) added to accelerate DSP accumulator based bounds check and limit operations: These instructions compare a signed value in the target accumulator with an upper (MAXAB) or lower (MINAB) limit held in the other accumulator. If the limit accumulator value is greater than upper (MAXAB) or less than lower (MINAB) limit, the limit accumulator is copied into the target accumulator. Again, these instruction can be implemented in two implementations:

MAXAB/MINAB: performs the function as stated above and sets status bits to indicate result MAXAB.v/MINAB.v: performs the same function as above and sets status bits to indicate result. Furthermore, these instructions save the signed value by which limit is exceeded into Wn or memory (useful for anti-windup algorithms) similar to the FLIM.v instruction but operating with 40-bit accumulator values.

Example 6

```
*
* Constrain Acc A to 32-bit limit
* values defined at address Limit
* and Limit+4.
* Write limit excess into W12.
* Exit to Error if limits exceed else
* continue.
*
    MOV.L     #Limit,W4
    LAC.D     [W4++],B
    MAXAB.v   A,W12
    LAC.D     [W4],B
    MINAB.v   A,W12
    BRA       NZ,Error
```

When both types of instructions are executed they can be designed to be executed subsequently as shown in the snippet above. These instructions automatically set the respective flags indicating that a maximum or minimum limit has been reached. According to one embodiment, the minimum limit instruction may be designed to perform like a no-operation instruction if no limit is reached, thereby not affecting the flags of the status register. Thus, as shown above the branch instruction needs to be executed only once. If the maximum limit instruction triggers a flag, the minimum limit instruction would not reset it as it would execute like a nop instruction. The following branch instruction would execute correctly. This functionality may only require that the MAXAB(.v) instruction is executed before the MINAB(.v) instruction.

Further instructions can be implemented which also do not require a dual or multi-core design. According to some embodiments, a 32-bit Load/Store Accumulator instructions (LAC.d/SAC.d) can be added to accelerate movement of intermediate results where resolution cannot be lost: Existing Load/Store Accumulator (LAC/SAC) instructions move 16-bit data; No direct means to move 1.31 accumulator data exist in the conventional dsPIC core. According to various embodiments, instructions extended to move 32-bit data may comprise:

LAC.d: Read, optionally shift, then sign extend 32-bit value from memory into accumulator A or B SAC.d: Optionally shift, then store LS 32-bits of accumulator A or B into memory According to some embodiments, these can be implemented as single instruction words, which may execute in 2 cycles.

According to other embodiments, an accumulator normalization (NORM) instruction can be added to accelerate existing normalization sequence (using FBCL instruction). Existing CPU ISA supports accumulator data normalization through use of multiple instructions including Find First Bit Clear Left (FBCL):

6 instruction, 5 cycle operation (up to 16-bit shift only).

Some embodiments may implement a NORM instruction that uses only 1 instruction word and executes in 1 cycle. The instruction automatically normalizes target accumulator by up to 16-bits in either direction. It may be cascaded for normalizations >16bits:

Exponent from each iteration can then be added;

This results in 3 instructions, 3 cycle operation

However, other implementations of a NORM instruction may be able to normalize the entire accumulator in a single iteration.

According to some embodiments, Bit field instructions (BFINS/BFEXT) are added to improve compiler efficiency. Compiled code frequently needs to insert or extract multiple bits within a target word: Bit field offsets and widths are invariably constant values BFINS: Writes a bit field from a CPU W-register or from a literal value into a target word BFEXT: Reads a bit field from a target word and loads it into a CPU W-register All bit field instructions are 2 word, 2 cycle operations: Without bit field, entire operation requires around 7 words, 7 cycles to complete; With bit field, entire operation requires around 4 words, 4 cycles to complete.

According to some embodiments, a divide improvement provide an interruptible, non-restoring divide suite of instructions (same as for a conventional dsPIC): Execution time is now 7 cycles (P33E:19 cycles) for all divide instructions (includes 1 cycle for REPEAT instruction) and is fully backwards compatible with existing application code using original divide REPEAT count.

Furthermore, according to some embodiments, an alternate set of divide instructions can be provided to improve compiler register allocation efficiency: Existing (32/16-bit) divide instructions: Dividend in Wm+1:Wm, Divisor in Wn, and Remainder:Quotient in W1:W0

In an alternate set of divide instructions: Dividend in Wm+1:Wm, Divisor in Wn and Remainder:Quotient in Wm+1:Wm; wherein W1:W0 are preserved.

In summary, the following additional instructions can be provided, in particular for a dsPIC core comprising a CPU and a DSP engine. Only the first instructions LDSLV and VFSLV are specifically designed for multi-core devices, all other instructions may be optionally implemented in any combination:

LDSLV, VFSLV: Load and Verify Slave PRAM

FLIM{.v}: Signed 16-bit data value bounds check and limit

MAXAB{.v}, MINAB{.v}: Accumulator 1.31 data value bounds check and limit

LAC.d, SAC.d: Accumulator 32-bit load and store

NORM: Accumulator normalization

BFIN, BFEXT: Bit filed insert and extract

DIVx2: Alternate divide instruction set that preserve W1:W0

Figure 7:
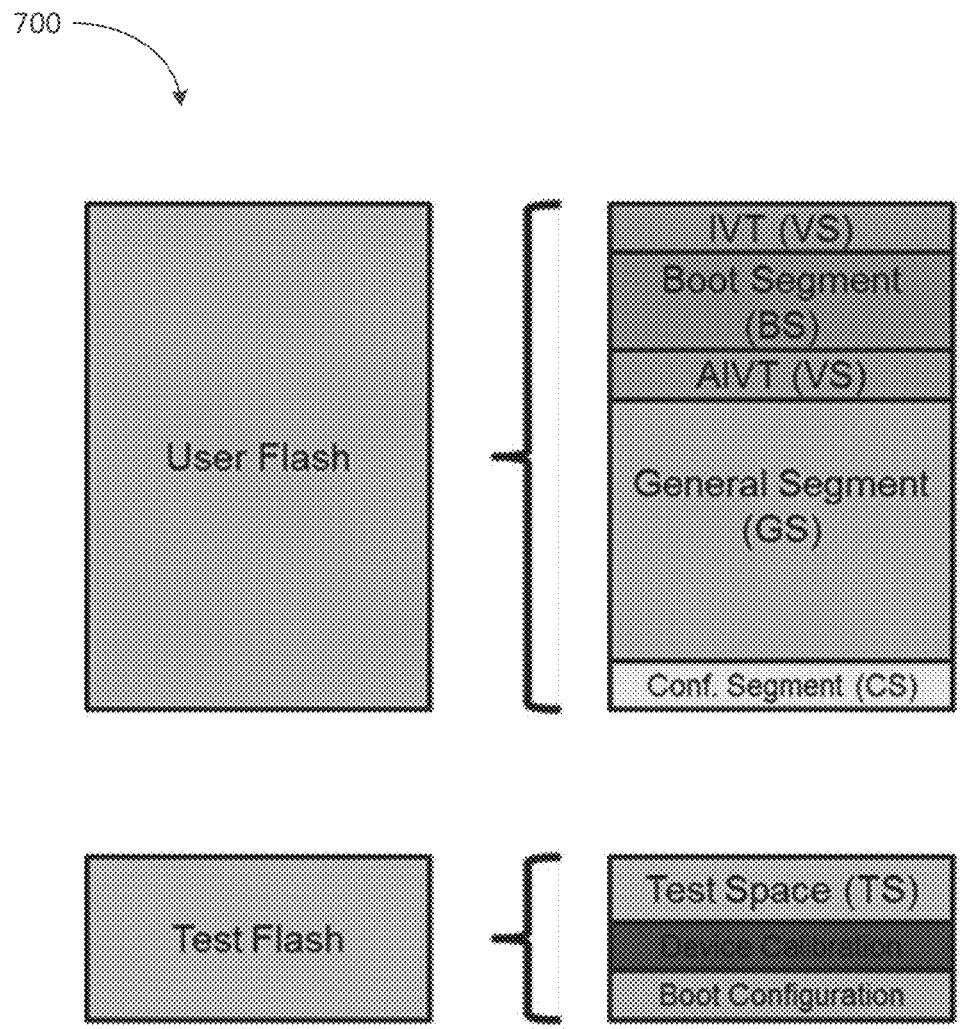
FIG. 7 shows segmentation of the Flash memory.

According to further embodiments as shown in FIG. 7, a code protect scheme for a dual-(multi-) core processor may be provided. This protection scheme is in particular beneficial for the Slave processor in a dual core microcontroller. According to other embodiments, this concept may also apply to a single core processor or microcontroller. FIG. 7 shows an exemplary code protect scheme 700. Flash memory may be split into several segments, each with its own rules pertaining to access of the other. For example, configuration registers which may be only configured during programming of the device or a fuse mechanism may be provided to set the access protection scheme. FIG. 7 shows that the flash is divided into a user flash and a test flash partition. However, other embodiments may only provide a single partition or even more partitions. The user flash partition is segmented into a boot segment and a general segment. Furthermore, smaller segments for interrupt vector tables IVT and AIVT may be provided, which may be included into the boot segment or which may have a separate protection depending on the currently set protection level. FIG. 7 shows an interrupt vector table IVT and an alternate interrupt vector table AIVT at different location. However, other embodiments may integrate these two table into one segment VS that may be located before the boot segment BS or at any other suitable location. Finally a configuration segment may be provided that comprises various device configuration registers that can only be written when the device is programmed, for example, by the integrated in-circuit program functions. The arrangement of the segments may differ according to a respective implementation. The protection scheme allows for a variety of different settings wherein the each segment may be protected differently. In particular, access from one segment to another segment may be restricted according to a specific setting. Furthermore, vectoring into a segment may be restricted according to a security setting.

If implemented according to some embodiments, the Test address space contains a few special sectors of Flash, all in the upper (highest address) half of the Program Space, which may for example be a 24-bit Program Space. The Configuration segment in such an embodiment (typically a single sector or less) resides within User Flash address space (lower half of the 24-bit Program Space:

One test sector is reserved for factory use (i.e., is only writeable in private test modes and otherwise always protected) and contains device ID info, "fuse" values for the device calibration data, etc. This sector also typically contains a single row of data for "customer OTP" data which the customer may only write to (never erase).

In Dual Boot (dual panel) devices as described above, another test sector is reserved for the Boot (operating) Mode fuse value. This sector is protected unless the user erases the entire device (Chip erase).

One or more test sectors are reserved for use during device test, and subsequently by the development tools to hold a Debug Exec. These sectors are writeable in public test modes (like debug mode).

The Configuration sector contains all the user programmable "fuses" to select user options. It has (user defined) write permissions based on the code protect level selected.

All "fuse" data is automatically read and loaded into special device configuration registers by the Flash Controller as a part of the device reset sequence.

As mentioned above, each segment may have its own access rules to prevent read/write access from another segment (hereinafter designated as "outside" access). Moreover, vectoring into a segment may be restricted, in particular in a high security setting. A table may define the settings for each segment depending on what type of operation is performed wherein different operations may have different security settings as will be shown in more detail in FIG. 10. The security can be split into read and write/erase protection separately, wherein, for example, a write protection bit may be used to set the write protection separately. The implementation may vary according to various embodiments. FIG. 8 shows an embodiment with three different levels of protection for the boot segment. FIG. 10 shows an embodiment with three different levels of protection for the general segment. Similar tables may be used for the other segments. Each protection level provides separate protection for a read access to different segments from outside the segment. In addition, each level may set whether write protection is set or not. In the embodiment shown in FIG. 8 for the boot segment and FIG. 10 for the general segment, a first level provides no read protection which generally applies to all accessed segments. If a write protection is active in this mode, it will be applied to all segments which then cannot be programmed or erased from "outside" the respective segment.

A second level is shown as the standard level. FIG. 8 shows the protection for the boot segment. In this setting, the boot segment cannot be read or written to from "outside" and depending on the write protection setting, may not be written to from actions executed within the boot segment. FIG. 10 shows the setting for the general segment. Here, the boot segment as well as the general segment can perform read operations within the general segment. Writing to the general segment is only allowed if the write protect bit is not set. Any operation from within the test segment will not allow read or write access to the general segment.

The third level is shown as the high protection level. In this setting, for the boot segment in addition to the standard setting protection vectoring into the boot segment may be restricted. Thus, this additional protection may prevent any modifications of the vector table. However, for the boot segment the protection may be identical to the standard setting.

FIG. 10 shows for the high security setting for the general segment, that any access from the outside is prohibited. In other words, the general segment can only be accessed from within the general segment. Even a Write access from within the general segment GS may be prohibited by setting the respective protection bit.

Figure 11:
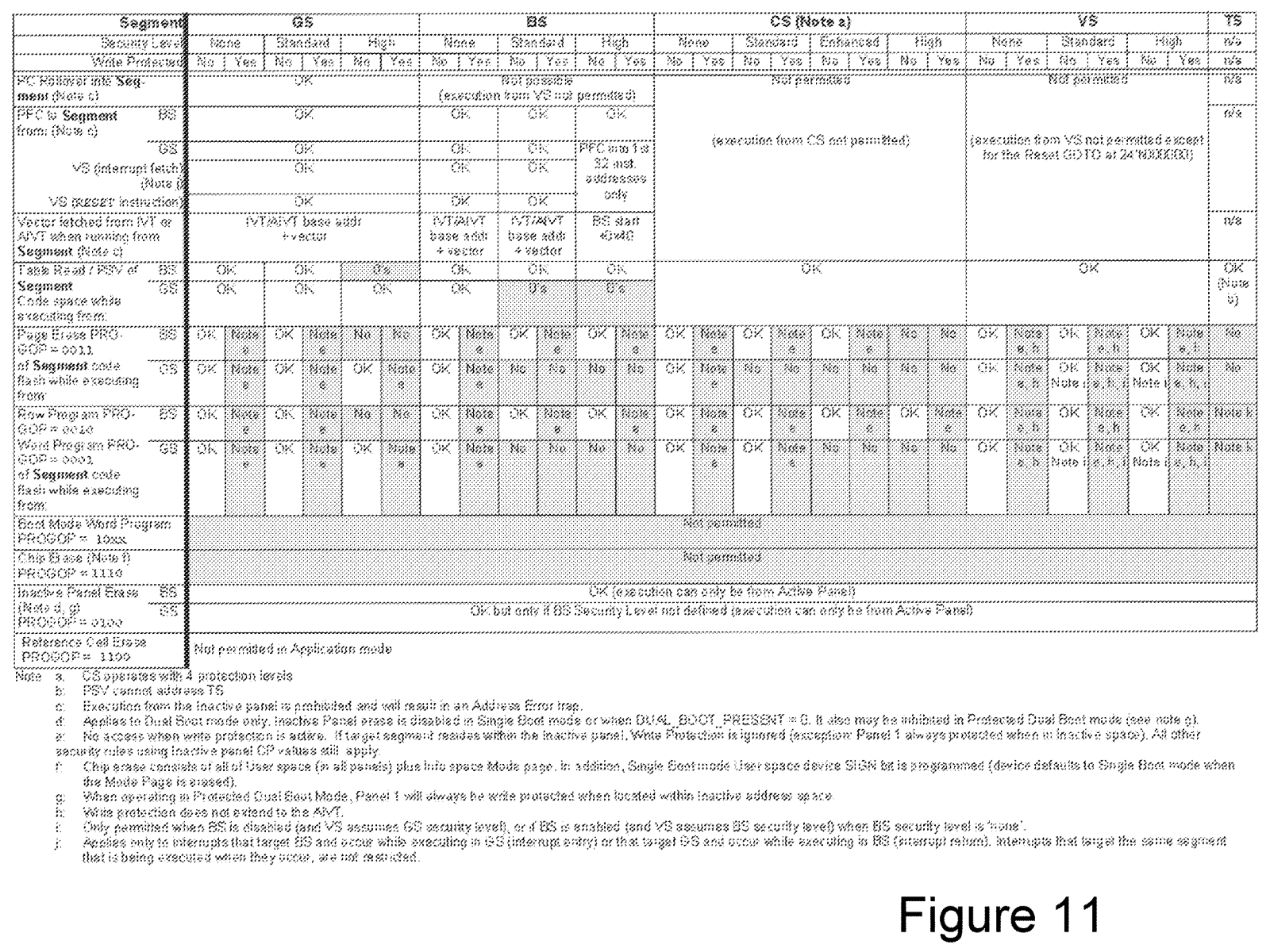

FIG. 11 shows an embodiment with a more detailed table with the security operations in application mode according to another embodiment in more detail. The operations are listed under the left-most column, and the corresponding influence on GS, BS, CS and VS is shown in the corresponding row. Various operations are defined. The first line (PC Rollover into Segment) concerns a program counter roll-over into another segment. The second line (PFC to Segment) concerns any type of program flow change, such as execution of a jump or a branch instruction and its effect on the various segments. The next line (Vector from IVT or AIVT) concerns vectoring into a specific segment. The next line (Table Read/PSV) concerns PSV or table read instruction access to a segment. The next line (Page Erase) concerns a page erase function that would affect a respective segment. The next line (Row Program) concerns the programming of a memory row. Other actions are sown in the following rows. Thus, different protection settings may apply to different types of action. Certain actions such as read and write operations may be performed within one segment but affect other segments. The protection scheme according to various embodiments allows to selectively protect these actions. Some actions such as those caused by an interrupt may not per se come from a specific segment, and therefore the table in FIG. 11 does not distinguish between the segments from they are executed. The table in FIG. 11 shows whether the action is allowed by showing an "OK" in the respective table cell or prohibited by showing either a "No" or "0's", wherein the latter indicates that the operation will produce a "0" read. Some examples with respect to FIG. 11 are:

Executing a TBLRD/PSV from segment GS will allow the CPU to see data from segment GS irrespective of the segment GS security level, but will only allow the CPU to see data from segment BS if its security is set to "none". Segment CS is always readable as is segment VS.

Attempting a page erase using code executing in segment BS that targets segment GS will fail if segment GS' write protect is enabled and/or segment GS security is "high". Note as discussed below that segment CS has and additional security level called "enhanced".

As shown in FIG. 11, a variety of different actions can be protected according to different settings wherein read and write actions may be separately protected. However, other implementations may not distinguish between read and write. In addition, FIG. 11 shows that for the configuration segment CS an additional security level may be implemented that may allow a separate intermediate protection level.

According to some embodiments, the Slave PRAM 426 may be allocated to either the boot segment (BS) or the general segment (GS) address space, for example, by a fuse circuit of by configuration registers as mentioned above. According to another embodiment, the Slave PRAM can only inherit Master segment GS security.

Thus, the Slave PRAM 426 will assume the security level assigned to the corresponding Master Flash segment of flash memory 416. The LDSLV/VFSLV instruction execution is now implemented such that it is sensitive to the respective Flash execution segment from which it is executed and to which the respective PRAM segment is assigned. Thus, the associated code protect security levels are applied when such an instruction is executed. The LDSLV/VFSLV are therefore seen within the PRAM as a read function. The program or page erase function and its associated security rules only applies to the flash memory. Thus, the already defined rules for BS/GS read of the Flash memory 416 will also be applied to Slave PRAM access when using the LDSLV/VFSLV instructions, which perform a read or write in the PRAM, such that:

LDSLV/VFSLV will work if executed from within BS of the master and the Slave PRAM is assigned to:
(1) the BS (irrespective of segment security level);
(2) the GS, and the GS is not at the 'High' security level.
LDSLV/VFSLV will work if executed from within GS of the master and the Slave PRAM is assigned to:

(1) the GS (irrespective of segment security level);
(2) the BS, and the BS is at the 'None' security level.

If the aforementioned conditions are not met, LDSLV/VFSLV execution will have no effect. Also, according to other embodiments other conditions may apply. The above conditions are mere examples. It is assumed that the Flash access code protect rules (for the source data read) will be met.

FIG. 9 shows an extended code protect scheme for the boot segment similar to that shown in FIG. 8. Again similar tables may be used for other segments. If the PRAM 426 is assigned to the boot segment of the master Flash memory 416, it may therefore be protected from untrusted code in segment GS by setting Master BS to any security level (i.e., a level other than 'None'). Conversely, if the PRAM is assigned to the segment GS of the master, it may also be protected from untrusted code in BS by setting Master GS to 'High' security.

The invention claimed is:

1. An integrated circuit comprising:
a master processing core having a central processing unit coupled with a non-volatile memory;
a slave processing core operating independently from the master processing core and having a central processing unit coupled with a volatile program memory;
wherein the master processing core is configured to cause a transfer of program instructions into the volatile program memory of the slave processing core; and
wherein the transfer of said program instructions is performed by executing a dedicated instruction within the central processing unit of the master processing core, wherein the transfer is performed without moving the program instructions through the master processing core,
wherein the volatile program memory of the slave processing core has at least two panels wherein only one panel is active with respect to the slave processing core and wherein the master processing core is configured to transfer program instructions only into an active panel.

2. The integrated circuit according to claim 1, wherein the dedicated instruction has a first operand defining a source address and a second operand defining a destination address, wherein the destination address is auto-incremented after execution of the dedicated instruction.

3. The integrated circuit according to claim 1, wherein the dedicated instruction causes an instruction word to be transferred into a buffer, and wherein the instruction word is written into the volatile program memory from the buffer.

4. The integrated circuit according to claim 3, wherein the instruction causes the non-volatile memory to output said instruction word whereupon said instruction word is captured by said buffer.

5. The integrated circuit according to claim 2, wherein the integrated circuit comprises a plurality of slave processing cores and the dedicated instruction has a third operand defining a target slave processing unit.

6. The integrated circuit according to claim 2, wherein the source address stored in the first operand can optionally be auto-incremented after execution of the dedicated instruction.

7. The integrated circuit according to claim 2, wherein the source address is stored in a special function register of a peripheral device associated with the master processing core.

8. The integrated circuit according to claim 7, wherein the peripheral device is a serial communication peripheral or a peripheral input port.

9. The integrated circuit according to claim 3, wherein the master processing core is further operable to execute a further instruction that verifies an instruction word stored in the volatile program memory.

10. The integrated circuit according to claim 9, wherein the further instruction causes a first instruction to be transferred into the buffer and wherein the content of the buffer is compared with a second instruction word stored in the volatile program memory.

11. The integrated circuit according to claim 10, wherein the further instruction comprises a first address which is applied to the non-volatile memory to output the first instruction word and a second address which is applied to the volatile program memory to output the second instruction word.

12. The integrated circuit according to claim 10, wherein the further instruction further verifies error correcting code (ECC) associated with the first and second instruction word and wherin the ECC associated with the first instruction word can be read from the non-volatile memory and the ECC associated with the second instruction word is separately generated.

13. A method for providing firmware for a processing core in a multi-core integrated circuit processing device comprising a first processing core having a first central processing unit coupled with a non-volatile memory and a second processing core operating independently from the first central processing unit and having a second central processing unit coupled with volatile program memory, the method comprising:
executing a dedicated instruction within the first central processing unit which causes at least one instruction to be written into the volatile program memory of the slave processing core, wherein a transfer is performed without moving the data through the first processing core, wherein the volatile program memory of the second processing core has at least two panels wherein only one panel is active with respect to the second processing core and wherein the first processing core is configured to transfer program instructions only into an active panel.

14. The method according to claim 13, wherein the dedicated instruction has a first operand defining a source address and a second operand defining a destination address, wherein the destination address is auto-incremented after execution of the dedicated instruction.

15. The method according to claim 13, wherein upon execution of the dedicated instruction, an instruction word is transferred from the non-volatile memory into a buffer, and the instruction word is written into the volatile program memory from the buffer.

16. The method according to claim 15, further comprising repeating said dedicated instruction in a loop.

17. The method according to claim 14, wherein the integrated circuit comprises a plurality of slave processing cores and the dedicated instruction has a third operand defining a target slave processing unit.

18. The method according to claim 15, wherein the source address stored in the first operand can optionally be auto-incremented after execution of the dedicated instruction.

19. The method according to claim 13, further comprising executing by the master processing core a further dedicated instruction that verifies an instruction word stored in the volatile program memory.

20. The method according to claim 18, wherein the further dedicated instruction causes a first instruction word to be transferred into the buffer and wherein the content of the buffer is compared with a second instruction word stored in the volatile program memory.

21. The method according to claim 19, wherein the further dedicated instruction comprises a first address which is applied to the non-volatile memory to output the first instruction word and a second address which is applied to the volatile program memory to output the second instruction word.

22. The method according to claim 19, wherein the further dedicated instruction further verifies error correcting code (ECC) associated with the first and second instruction word.

23. The integrated circuit according to claim 1, wherein the dedicated instruction is configured to move an instruction word that is wider than a data width of the master processing core that is executing the dedicated instruction.

24. The method to claim 13, wherein the dedicated instruction is configured to move an instruction word that is wider than a data width of the first processing core that is executing the dedicated instruction.

25. The method according to claim 21, wherein the ECC associated with the first instruction word can be read from the non-volatile memory and the ECC associated with the second instruction word is separately generated.

26. The integrated circuit comprising:
a master processing core having a central processing unit coupled with a non-volatile memory;
a slave processing core operating independently from the master processing core and having a second central processing unit coupled with a volatile program memory;
wherein the non-volatile memory of the first master processing core comprises a first code protection defined by a protection scheme and wherein the volatile program memory of the slave processing core has a second code protection that depends on a setting of the protection scheme;
wherein the protection scheme defines a plurality of segments of the non-volatile memory and wherein each segment has a protection setting in the protection scheme;
and wherein a register stores which segment of the non-volatile memory is selected to provide the setting for the second code protection of the volatile program memory.

27. The integrated circuit according to claim 26, wherein each protection setting for the non-volatile memory has a setting for a read operation and a setting for a program or erase operation.

28. The integrated circuit according to claim 26, wherein the protection scheme provides for a predefined number of security levels, wherein each security level defines a protection setting for each segment.

29. The integrated circuit according to claim 28, wherein the code protection for the volatile program memory is the same as the code protection for one of the segments of the non- volatile memory.

30. The integrated circuit according to claim 27, wherein a setting for a read operation of the non-volatile memory applies to read and write operations of the volatile program memory.

31. The integrated circuit according to claim 26, wherein when a segment is protected, depending on a protection setting, an instruction executed from one segment does not operate on a different segment.

32. The integrated circuit according to claim 26, wherein when a segment is protected, depending on a protection setting, a read instruction executed from one segment operates only on a predefined area of a different segment.

33. The integrated circuit according to claim 32, wherein the predefined area stores interrupt vectors.

34. The integrated circuit according to claim 26, wherein the non-volatile memory comprises a boot segment and a general segment.

35. The integrated circuit according to claim 26, wherein the non-volatile memory further comprises a test segment.

36. A method for protecting program memory for processing cores in a multicore integrated circuit processing device comprising a first processing core having a first central processing unit coupled with a non-volatile memory and a second processing core operating independently from the first processing core and having a second central processing unit coupled with volatile program memory, wherein the non-volatile memory of the first processing core comprises a first code protection defined by a protection scheme and wherein the volatile program memory of the second processing core has a second code protection that depends on the setting of the protection scheme, the method comprising:
programming the first code protection circuit to apply selected protection schemes for the nonvolatile memory and the volatile program memory, respectively;
wherein the protection scheme defines a plurality of segments of the non-volatile memory and wherein each segment has a protection setting in the protection scheme;
and wherein a register stores which segment of the non-volatile memory is selected to provide the setting for the second code protection of the volatile program memory.

37. The method according to claim 36, wherein each protection setting for the non-volatile memory has a setting for a read operation and a setting for a program or erase operation.

38. The method according to claim 36, wherein the protection scheme provides for a predefined number of security levels, wherein each security level defines a protection setting for each segment.

39. The method according to claim 38, wherein the second code protection for the volatile program memory is the same as the protection setting for one of the segments of the non-volatile memory.

40. The method according to claim 37, wherein a setting for a read operation of the non-volatile memory applies to read and write operations of the volatile program memory.

41. The method according to claim 36, wherein when a segment is protected, depending on a protection setting, an instruction executed from one segment does not operate on a different segment.

42. The method according to claim 36, wherein when a segment is protected, depending on a protection setting, a read instruction executed from one segment operates only on a predefined area of a different segment.

43. The method according to claim 42, wherein the predefined area stores interrupt vectors.

44. The method according to claim 36, wherein the non-volatile memory comprises a boot segment and a general segment.

45. The method according to claim 44, wherein the non-volatile memory further comprises a test segment.

* * * * *